United States Patent
Clossen-Von Lanken Schulz et al.

(10) Patent No.: US 9,643,222 B2
(45) Date of Patent: May 9, 2017

(54) ULTRASONIC APPARATUS, AND ASSOCIATED HOLDING DEVICE, FOR CLEANING COMPONENT SURFACES

(71) Applicant: SIEMENS AKTIENGESELLSCHAFT, München (DE)

(72) Inventors: Michael Clossen-Von Lanken Schulz, Issum (DE); Matthias Dierks, Alpen (DE); Sebastian Jakielski, Bottrop (DE); Stefan Obermayr, Mülheim (DE)

(73) Assignee: SIEMENS AKTIENGESELLSCHAFT (DE)

( * ) Notice: Subject to any disclaimer, the term of this patent is extended or adjusted under 35 U.S.C. 154(b) by 29 days.

(21) Appl. No.: 14/648,967

(22) PCT Filed: Dec. 3, 2013

(86) PCT No.: PCT/EP2013/075343
§ 371 (c)(1),
(2) Date: Jun. 2, 2015

(87) PCT Pub. No.: WO2014/095340
PCT Pub. Date: Jun. 26, 2014

(65) Prior Publication Data
US 2015/0298177 A1    Oct. 22, 2015

(30) Foreign Application Priority Data

Dec. 21, 2012  (DE) .................... 10 2012 224 196

(51) Int. Cl.
*B08B 3/12*   (2006.01)
*F16M 13/02*  (2006.01)

(52) U.S. Cl.
CPC ............ *B08B 3/12* (2013.01); *F16M 13/02* (2013.01); *B08B 2203/0288* (2013.01)

(58) Field of Classification Search
None
See application file for complete search history.

(56) References Cited

U.S. PATENT DOCUMENTS 4,145,000 A * 3/1979 Smith .................. F04F 5/42
                                                     239/14.2
4,646,967 A * 3/1987 Geithman ........... B05B 17/0623
                                                     239/102.2
(Continued)

FOREIGN PATENT DOCUMENTS

DE    40 38 662 A1    6/1992
DE    195 40 373 A1   5/1997
(Continued)

OTHER PUBLICATIONS

International Search Report dated Jan. 31, 2014 issued in corresponding International patent application No. PCT/EP2013/075343.
(Continued)

*Primary Examiner* — Michael Barr
*Assistant Examiner* — Christi Tate-Sims
(74) *Attorney, Agent, or Firm* — Ostrolenk Faber LLP

(57) ABSTRACT

An ultrasonic apparatus for cleaning component surfaces (40) by means of a transporting liquid in which ultrasonic waves can be transported, the apparatus including an inlet (6) mounted on a body for filling the transporting liquid into the body, an ultrasonic oscillator (3) in the body for producing ultrasonic waves, a feed in the body for guiding the transporting liquid from the inlet (6) directly to the ultrasonic oscillator (3), so that the ultrasonic waves can be introduced into the transporting liquid and the liquid can be transported, an outlet (7) connected to the feed for discharging the transporting liquid which transports the ultrasonic
(Continued)

waves from the body, so that a directed cleaning jet is produced. In addition, a holding device for such an ultrasonic apparatus is provided.

9 Claims, 3 Drawing Sheets

(56) References Cited

U.S. PATENT DOCUMENTS

| | | | |
|---|---|---|---|
| 5,368,054 A | | 11/1994 | Koretsky et al. |
| 5,383,483 A | * | 1/1995 | Shibano .................... B08B 3/12 134/111 |
| 5,927,306 A | * | 7/1999 | Izumi ....................... B08B 3/02 134/155 |
| 6,202,658 B1 | * | 3/2001 | Fishkin ............. H01L 21/67046 134/147 |
| 7,549,429 B2 | | 6/2009 | Nunomura et al. |
| 7,601,618 B2 | | 10/2009 | Drevet et al. |
| 2009/0223536 A1 | | 9/2009 | Nomura et al. |

FOREIGN PATENT DOCUMENTS

| | | |
|---|---|---|
| EP | 0 658 925 A1 | 6/1995 |
| EP | 1 600 088 A1 | 11/2005 |
| FR | 2 917 985 A1 | 1/2009 |
| FR | 2917985 A1 * | 1/2009 ............ B05B 7/205 |
| WO | WO 97/16263 A1 | 5/1997 |

OTHER PUBLICATIONS

Written Opinion dated Jan. 31, 2014 issued in corresponding International patent application No. PCT/EP2013/075343.
International Search Report and Written Opinion of the International Searching Authority dated Jan. 31 2014 in corresponding International Application No. PCT/EP2013/075343 (English language translation)(11 pages).
Search Report and Written Opinion dated Aug. 14, 2013 in corresponding German Patent Application No. 10 2012 224 196.5 (5 pages).

\* cited by examiner

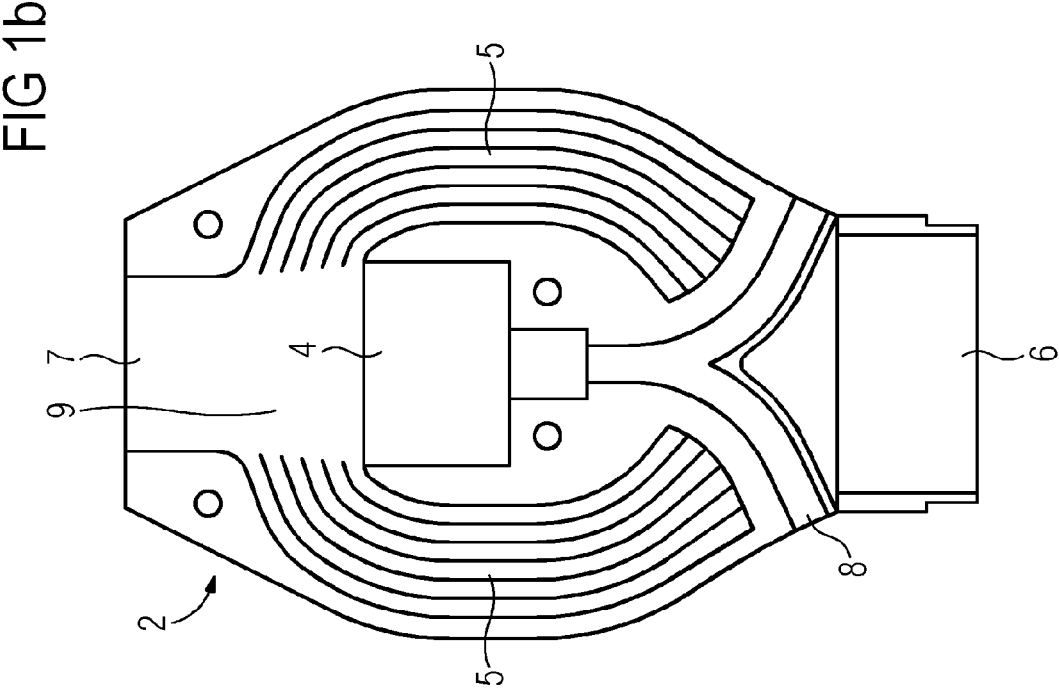
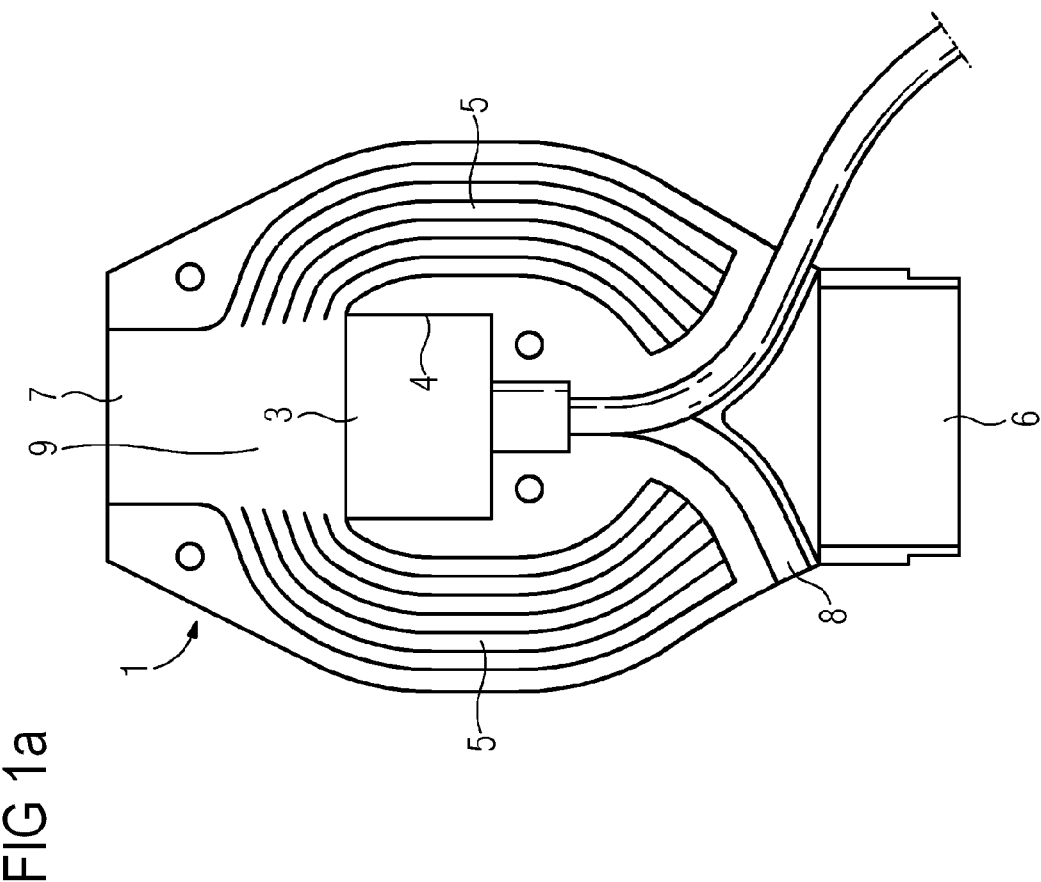

ULTRASONIC APPARATUS, AND ASSOCIATED HOLDING DEVICE, FOR CLEANING COMPONENT SURFACES

CROSS-REFERENCE TO RELATED APPLICATIONS

The present application is a 35 U.S.C. §§371 national phase conversion of PCT/EP2013/075343, filed Dec. 3, 2013, which claims priority of German Patent Application No. 10 2012 224 196.5, filed Dec. 21, 2012, the contents of which are incorporated by reference herein. The PCT International Application was published in the German language.

Depending on the specific operating situation and the composition of the fuels used for driving the internal combustion engine, it is the case for example in the turbine that, sooner or later, contamination of the turbine shaft and of the various turbine housing parts occurs or deposits form on them. Deposits may arise for example owing to the chemical reaction between sulfur compounds in the fuel and the base material of the burner components. Iron sulfide deposits thus form in the interior of the burner. Other types of contamination or deposits however also arise as a result of the combustion.

Such contaminants or deposits lead to reduced turbine efficiency and accordingly to a reduction in power output. This causes an increase in the exhaust-gas temperatures in the combustion chamber, whereby both the internal combustion engine and the turbocharger can be thermally overloaded. In particular, damage to or even destruction of individual components can occur in the internal combustion engine. Cleaning of the component surfaces is thus necessary.

For the cleaning of the component surfaces, use may be made of solvents or other washing substances such as tensides. However, these entail excessive outlay in terms of time and costs in the case of stubborn contaminants and deposits on large component surfaces. It has been necessary for component surfaces of large components, for example turbine components, to be cleaned by way of abrasive methods, for example sandblasting or grinding. In the case of sensitive component surfaces, these can impair, because such methods are always associated with a removal of material, depending on the blasting medium. In the case of sandblasting, it is furthermore necessary, for example, for any gaps that may be present to be taped over beforehand, because entry of sand particles into the gap is possible here. The taping must subsequently be removed again using solvents, with considerable outlay in terms of time.

For cleaning relatively small articles, it is possible to use ultrasonic cleaning, which does not damage the component surfaces. An ultrasonic cleaning arrangement however has the disadvantage of being tied to a particular location and of having to exhibit enormous volumes depending on component size.

SUMMARY OF THE INVENTION

It is thus an object of the invention to provide an improved cleaning apparatus which overcomes the disadvantages described above. It is a further object to provide a holding device for an apparatus of the type.

According to the invention, the object is achieved, with an ultrasonic apparatus disclosed herein, by means of the features whereby at least an inlet mounted on a body conducts the transport liquid into the body, an ultrasonic oscillator in the body generates ultrasonic waves, a feed in the body conducts transport liquid from the inlet directly to the ultrasonic oscillator, such that the ultrasonic waves can be introduced into the transport liquid and transported, an outlet connected to the feed discharges the transport liquid which transports the ultrasonic waves from the body, such that a directed cleaning jet is generated.

The ultrasonic apparatus according to the invention generates a directed, defined cleaning jet which can transport ultrasonic waves. The cleaning jet is directed toward the component surface to be cleaned. The ultrasonic oscillator generates ultrasonic waves which propagate through the directed transport liquid jet to the surface being cleaned. When the waves strike that surface, the waves loosen the contaminants by cavitation. The ultrasonic apparatus implements a so-called soft surface cleaning by means of ultrasonic waves and in mobile fashion. This makes it possible to dispense with large ultrasonic basins. The aggressive medium used in sandblasting can be dispensed with. Component surfaces are thus no longer subjected to undesired material removal. By means of the ultrasonic apparatus according to the invention, it is possible for component surfaces of large components to be cleaned on site. Contaminants on the component surfaces can, in mobile fashion, be loosened by means of ultrasonic waves conducted by an adequately large transport liquid jet.

The outlet preferably comprises at least one elongate section. This makes it possible for the cleaning jet to be directed in a more defined manner onto the surface to be cleaned.

The body is preferably formed from a first plate and a second plate fastened on the first plate, wherein the first plate and the second plate fastened thereon together form at least one first cavity in which the ultrasonic oscillator is arranged. It is self-evidently also possible for multiple cavities with ultrasonic oscillators to be provided. Said ultrasonic oscillators may however also be accommodated in the single cavity.

At least the first plate comprises, at least one channel to serve as at least one feed for conducting the transport liquid flowing through the inlet directly to the at least one ultrasonic oscillator. In this way, the ultrasonic waves can be introduced into the transport liquid and transported.

The second plate also has a channel corresponding to the first plate. As a feed, a channel arrangement is preferably provided, wherein the channel arrangement is comprised of multiple parallel channels arranged in the first plate and of multiple parallel channels which are arranged in the second plate and which correspond to the first plate. For example, each channel in the second plate that corresponds to a respective channel in the second plate overlies the respective channel. Through the uniform parallel channel arrangement, the transport liquid flows without turbulence to a point directly in front of the ultrasonic oscillator, in order to have the ultrasonic waves imparted to them. For this purpose, the channel arrangement has a collecting point without channels, wherein the collecting point is directly adjacent to the ultrasonic oscillator. Owing to the channel arrangement, it is the case even at the outlet that no turbulence arises in the emerging transport liquid jet which transports the ultrasonic waves. The jet can therefore be directed in a defined manner onto the component surface.

In a preferred refinement, water is provided as transport liquid. In this way, by contrast to cleaning using washing agents or other washing substances, the only waste produced is normal water with the dirt particles.

The object relating to the holding device is achieved through the specification of a holding device for an ultrasonic apparatus disclosed herein.

By means of at least one gripping arm, the ultrasonic apparatus can be operated in a simplified fashion, without having to be separately manually held still. Handling is thus greatly simplified.

BRIEF DESCRIPTION OF THE DRAWINGS

By means of the additional connection between the at least one gripping arm and a vessel, the ultrasonic apparatus can be operated even with a transport liquid that has been charged with high flow pressure beforehand.

Further features, characteristics and advantages of the present invention will emerge from the following description with reference to the appended FIGS. 1-3, in which:

FIG. 1a shows a first part of an ultrasonic apparatus according to the invention, FIG. 1b shows a second part of an ultrasonic apparatus according to the invention.

DESCRIPTION OF EMBODIMENTS

Figure 2:
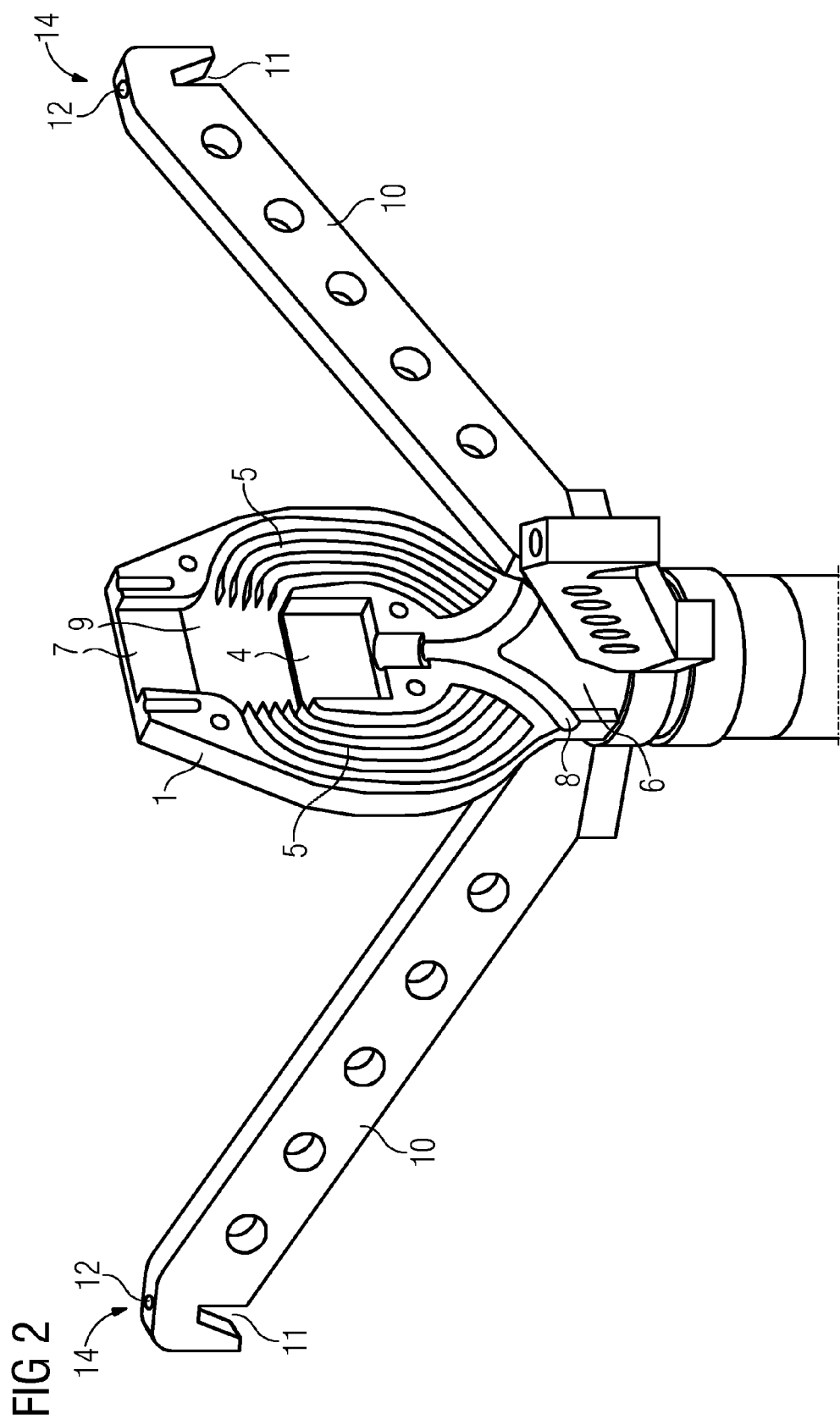
FIG. 2 shows the cross section of an ultrasonic apparatus according to the invention with a holding device according to the invention.

The ultrasonic apparatus according to the invention comprises a body which is comprised of a first plate 1 (FIG. 1a) and a second plate 2 (FIG. 1b) which are connected to one another for example by screws. Other connections are self-evidently also possible. The body has a first cavity 4 in which an ultrasonic oscillator 3 (FIG. 1a) is arranged.

Furthermore, the body comprises, mounted thereon, an inlet 6 for the transport liquid, in order for the body to be filled with the transport liquid. Here, it is particularly advantageous if the transport liquid has been charged with high pressure beforehand.

Furthermore, the first plate 1 and the second plate 2 comprise a channel arrangement 5 comprised of multiple parallel grooves which correspond with one another and which conduct the transport liquid. Here, the channels are arranged to the right and to the left of the ultrasonic oscillator 3. The channels lead into a collecting point 9 which is for example formed without channels and which is directly adjacent to the ultrasonic oscillator 3. The transport liquid flows from the inlet 6 through the channel arrangement directly into the collecting point 9 in front of the ultrasonic oscillator 3, which generates the ultrasonic waves. Thus, the transport liquid can absorb the ultrasonic waves and transport them. From there, the transport liquid which transports the ultrasonic waves flows directly through an outlet 7 mounted on the body. In this case, the outlet comprises an elongate section. Thus, the emerging cleaning jet can be directed in a more defined manner onto a component surface. Through the uniform, parallel channel arrangement 5, the transport liquid flows without turbulence to a point directly in front of the ultrasonic oscillator 3. In this way, it is the case even at the outlet 7 that no turbulence arises in the emerging transport liquid jet which transports the ultrasonic waves. The transport liquid is in this case caused to flow into the body with a pressure sufficient to ensure that a defined, directed transport liquid jet which transports the ultrasonic waves emerges at the outlet 7. It is self-evidently also possible for the pressure to be imparted, after the transport liquid has absorbed the ultrasonic waves, in a further cavity (not shown) by way of a pressure generator (likewise not shown) in the body. It is self-evidently also possible for the transport liquid to flow over the ultrasonic oscillator 3. The ultrasonic oscillator 3 thus has an active surface which is surrounded by the outflowing water.

The body furthermore has a duct 8 in which there is fitted a line which supplies energy to the ultrasonic oscillator 3.

Figure 3:
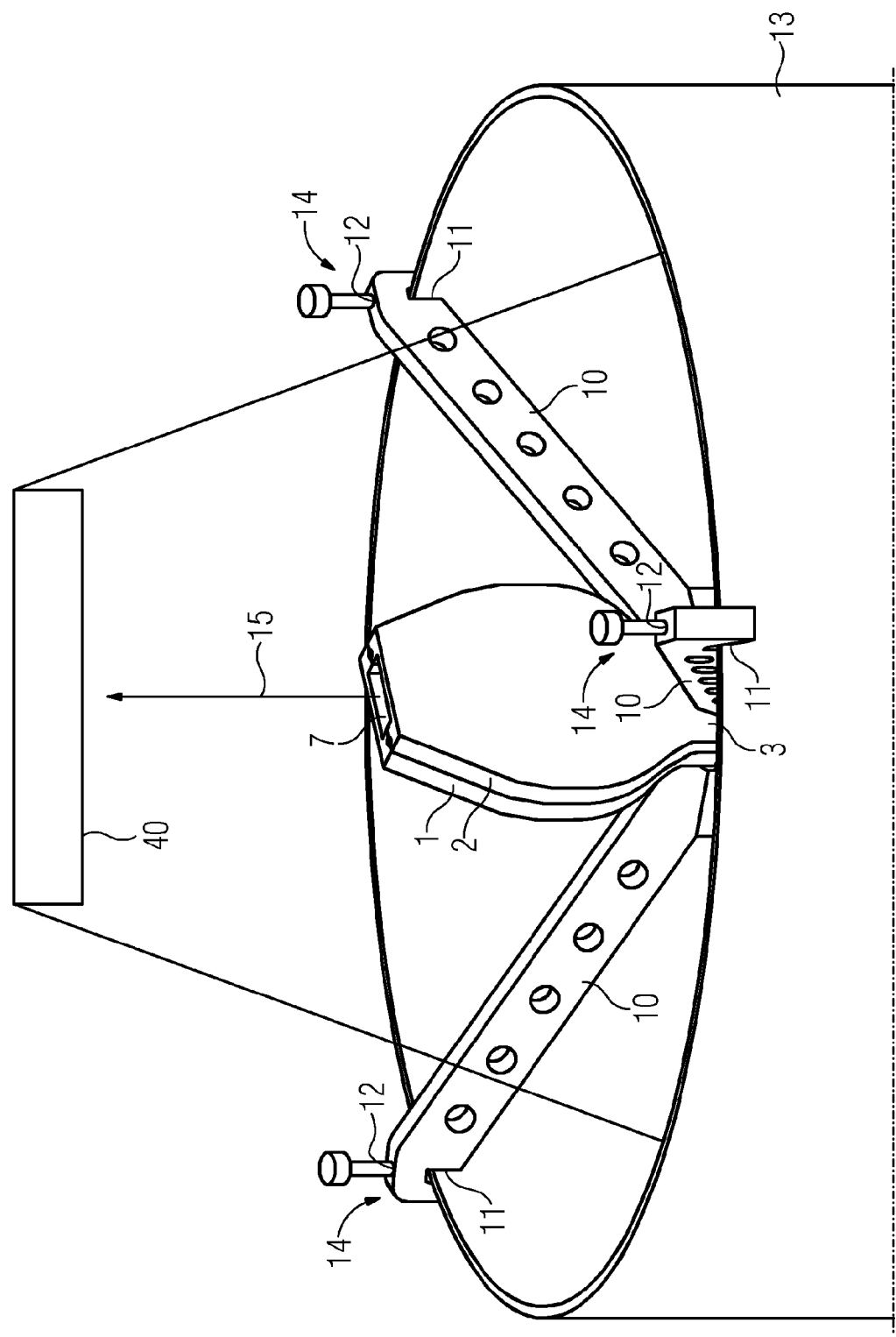
FIG. 3 shows an ultrasonic apparatus according to the invention with a holding device according to the invention during operation.

FIG. 2 shows a cross section of an ultrasonic apparatus according to the invention with a holding device according to the invention. The holding device has two gripping arms 10 which are provided on the inlet 6 and/or on the body of the ultrasonic apparatus. The gripping arms 10, at their ends 14 remote from the body, have in each case a groove 11. Said grooves 11 serve for mounting the gripping arms 10 on a vessel 13 (FIG. 3). The gripping arms 10 also have a bore 12 in the grooves 11 for the purposes of a connection, in particular push-fit connection or screw-type connection, to the vessel 13 (FIG. 3). A corresponding bore 12 is provided on the vessel 13 (FIG. 3). Thus, the ultrasonic apparatus has a fixed connection to the vessel 13 (FIG. 3) even during operation.

FIG. 3 shows the ultrasonic apparatus with the holding device during operation. In this case, the holding device is comprised of three gripping arms 10 with a groove 11. The three gripping arms 10 are mounted by way respective grooves 11 on the vessel 13. For a fixed connection between holding device and vessel 13, a bore 12 is provided which is formed in the respective groove 11 and in which there is installed a screw-type connection or a push-fit connection.

Here, water is used as transport liquid. The water flows through a line (not shown) to the inlet 6 and through the body, where the ultrasonic waves to be transported onward are introduced. The water transporting ultrasonic waves emerges again as a directed water jet 15 through an outlet 7. The water jet subsequently strikes a component surface 40 to be cleaned. In the ultrasonic oscillator 3 (FIGS. 1a and 1b), ultrasonic waves are generated which propagate through the water jet to the surface 40 being cleaned, and when they strike the surface they loosen the contaminants by cavitation.

By means of the ultrasonic apparatus according to the invention and the holding device according to the invention, soft surface cleaning by ultrasonic waves can be implemented in mobile fashion. It is thus possible to dispense with large ultrasonic basins. Furthermore, by contrast to cleaning with washing agents or other washing substances, the only waste produced is normal water with the dirt particles. An aggressive medium used in sandblasting can be dispensed with. In this way, the component surfaces 40 are no longer subjected to undesired material removal. The ultrasonic apparatus according to the invention can be utilized without restriction to a particular location and size. The ultrasonic apparatus according to the invention is self-evidently also suitable for use for relatively small component surfaces.

The invention claimed is:

1. An ultrasonic apparatus for cleaning component surfaces using a transport liquid in which ultrasonic waves can be transported, comprising at least:
   a body;
   an inlet mounted on the body, the inlet being configured for the body to be filled with the transport liquid supplied through the inlet;

an ultrasonic oscillator in the body located and configured for generating ultrasonic waves in the liquid;

a feed for conducting the transport liquid from the inlet directly to the ultrasonic oscillator for generating the ultrasonic waves into the transport liquid and transporting the waves;

an outlet connected to the feed for discharging the transport liquid which transports the ultrasonic waves from the body, for generating a directed cleaning jet;

the body being formed from a first plate and a second plate fastened on the first plate, wherein the first plate and the second plate fastened thereon together form at least one first cavity in which the ultrasonic oscillator is positioned; and at least the first plate comprises, as at least one feed, at least one channel for conducting the transport liquid flowing through the inlet directly to the at least one ultrasonic oscillator, the at least one channel extending around the at least one ultrasonic oscillator from a first end of the at least one channel, which is between the inlet and a first end of the at least one ultrasonic oscillator, which is closest to the inlet, to a second end of the at least one channel, which is between the outlet and a second end of the at least one ultrasonic oscillator, which is closest to the outlet.

2. The ultrasonic apparatus as claimed in claim 1, wherein the outlet comprises at least one elongate section extending past the oscillator.

3. The ultrasonic apparatus as claimed in claim 1, wherein the second plate also has at least one channel corresponding to the at least one channel in the first plate.

4. The ultrasonic apparatus as claimed in claim 3, wherein the at least one channel in the first plate and the at least one channel in the second plate comprise a channel arrangement defining at least one feed, the channel arrangement being comprised of multiple parallel channels arranged in the first plate and also of multiple parallel channels arranged in the second plate.

5. The ultrasonic apparatus as claimed in claim 4, wherein:

the channel arrangement has a collecting point without channels at the collecting point and, wherein the collecting point is adjacent to the ultrasonic oscillator.

6. The ultrasonic apparatus as claimed in claim 1, wherein the transport liquid is water.

7. A holding device for the ultrasonic apparatus having the body as claimed in claim 1, the holding device comprising:

at least one gripping arm provided on at least one of the inlet and the body.

8. The holding device as claimed in claim 7, wherein the at least one gripping arm includes an end remote from the body having a groove therein, the end of the gripping arm and the groove being configured for mounting the gripping arm on a vessel.

9. The holding device as claimed in claim 8, further comprising a connection device in the respective groove by which the at least one gripping arm is configured to be fixed to the vessel.

* * * * *